Dec. 10, 1940.  W. LANCASTER  2,224,436
NEUTRAL WIRE BRACKET
Filed Nov. 8, 1938
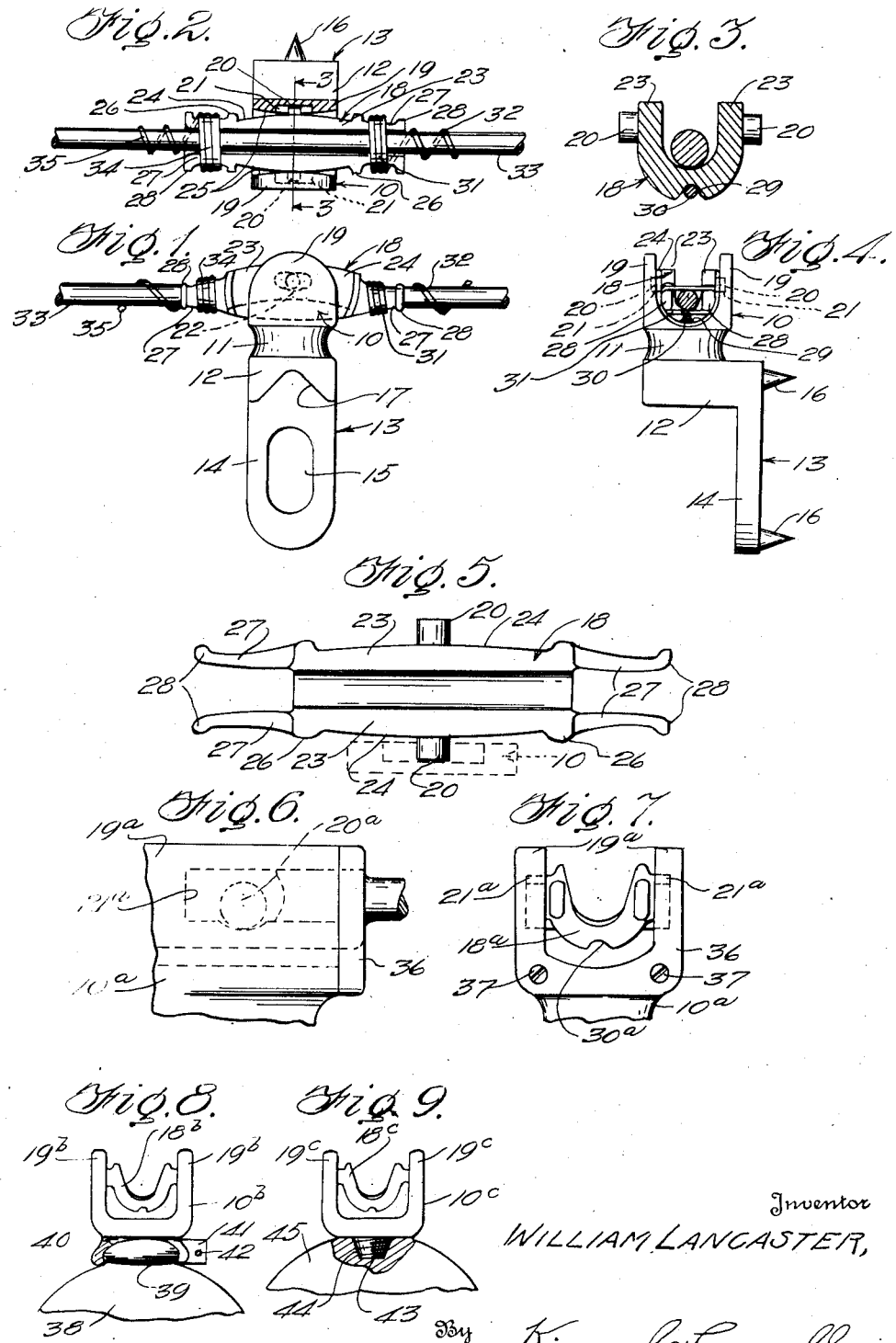
Inventor
WILLIAM LANCASTER,
By Kimmel & Crowell,
Attorneys Patented Dec. 10, 1940

2,224,436

UNITED STATES PATENT OFFICE 2,224,436

NEUTRAL WIRE BRACKET

William Lancaster, Alexandria, Va., assignor to Hubbard and Company, Pittsburgh, Pa., a corporation of Pennsylvania Application November 8, 1938, Serial No. 239,555

9 Claims. (Cl. 248—65)

This invention relates to wire supporting devices and more particularly to a support in the form of a bracket designed for use with a neutral wire.

At the present time, the neutral wire is supported by means of brackets secured to poles or the like and one of the difficulties experienced is that the swinging or movement of the wire or cable has a tendency to break the wire at the point where the wire passes through or over the bracket and it is therefore, an object of this invention to provide a bracket or supporting device for a wire or cable which is so designed that the wire or cable will be firmly held relative to the bracket, but at the same time the bracket will provide for a limited movement of the wire with respect to the bracket so that the swinging movement of the wire or cable will not cause the wire or cable to break at the point where it is secured to the bracket.

Another object of the invention is to provide a bracket or wire supporting device which includes a cradle or saddle and means for holding the cradle or saddle in such a manner as to provide a substantially universal movement of the cradle or saddle to a limited degree.

A further object of this invention is to provide in a device of this kind means for dampening the vibrations of the wire relative to the support.

A still further object of this invention is to provide a device of this kind which may be used as an attachment for present dielectric insulators so that the present insulators may be provided with a movable support for the wire or cable in order to prevent breaking of the wire at the point where the wire is secured to or passes over the insulator.

A still further object of this invention is to provide an improved cradle or saddle for supporting the wire or cable which is so constructed that the means for securing the wire or cable to the saddle or cradle may be extended along the wire from the opposite ends of the cradle so as to dampen the vibrations of the wire.

To the above objects and others which may hereinafter appear, the invention consists of the novel construction, combination and arrangement of parts as will be more specifically referred to and illustrated in the accompanying drawing, wherein are shown embodiments of this invention, but it is to be understood that changes, variations and modifications may be resorted to which fall within the scope of the invention as claimed.

In the drawing:

Figure 1 is a detail front elevation of a neutral wire bracket constructed according to an embodiment of this invention, Figure 2 is a detail top plan of the bracket partly in section, Figure 3 is an enlarged sectional view of the cradle or saddle removed from the support and taken substantially on the line 3—3 of Figure 2, Figure 4 is a detail side elevation of the bracket showing the wire in section, Figure 5 is a detail top plan of the cradle or saddle removed from the support, a portion of the support being shown in dotted lines, Figure 6 is a fragmentary front elevation of a modified form of bracket, Figure 7 is a detail side elevation of the bracket shown in Figure 6, Figure 8 is a fragmentary side elevation of a further modification of this invention, and Figure 9 is a detail side elevation partly broken away and in section of a further modification.

Referring to the drawing and first to Figures 1 to 5 inclusive, the numeral 10 designates generally a substantially U-shaped saddle or cradle supporting member which is disposed with the parallel legs thereof in upstanding position. The U-shaped member 10 is provided at the lower or base portion thereof with a post 11 which is secured to a horizontally disposed leg 12 of an L-shaped bracket member 13. The horizontal leg 12 of the bracket 13 has a vertical leg 14 formed integral therewith which is provided with an elongated slot 15 therethrough to receive an attaching bolt for attaching the bracket 13 to a support in the form of a post or the like. The outer side of the vertical leg 14 is provided with a pair of spaced apart pointed pins or tangs 16 which are adapted to project into the side of a post and coact with the securing bolts in holding the bracket 13 firmly on the support when the outer side of the bracket 13 is disposed in face abutting relation to the side of the support.

The horizontal base leg 12 of the bracket 13 is provided on its under side with a V-shaped recess or channel 17 which forms a pair of tapering bracing flanges on the opposite edges of the leg 12.

A wire supporting cradle or saddle generally designated as 18 is positioned between the parallel legs 19 of the U-shaped member 10 and this saddle 18 is provided at a point substantially medially of the length thereof with opposed laterally projecting trunnions 20. The trunnions 20 are adapted to slidably and rockably engage in the elongated slots 21 provided in the confronting sides or faces of the parallel legs 19. The slots 21 are preferably provided at a point between the ends thereof and on the lower side with a depression or recess 22 which forms a seat within which the trunnions 20 are adapted to normally engage.

The cradle or saddle 18 is provided on the opposite sides of the parallel legs 23 thereof with arcuate faces 24, and the inner sides of the parallel legs 19 are also provided with convex faces 25 so that when the cradle or saddle 18 is positioned between the legs 19, this saddle may have a limited and substantially universal movement relative to the supporting member 10. This movement may be a sliding movement limited by the length of the slot 20 and in addition to a vertical rocking movement and a limited horizontal swinging movement.

The cradle or saddle 18 is provided at the opposite ends thereof with ribs or flanges 26 and also with a pair of longitudinally extending fingers or arms 27. These arms or fingers 27 are flared outwardly as shown in Figure 5 and terminate at their outer ends in enlargements 28.

The cradle or saddle 18 is provided on the underside or bight thereof with a longitudinal extending channel 29 within which a wire tie member 30 is adapted to engage. The tie member 30 is constructed in the form of a wire which has the intermediate portion thereof seated in the channel 29 and one end of the tie wire is then wrapped spirally about the fingers 27 at one end of the saddle 18 as shown at 31, and this end of the wire is then extended beyond the adjacent end of the saddle 18 as shown at 32 in convolutions which are spaced apart a relatively wide distance as shown in Figures 1 and 2. This extended convolution portion 32 acts as a vibration dampening means so as to dampen a considerable proportion of vibrations of a wire or cable 33 which is seated in the cradle 18. The other end of the tie wire 30 is wrapped about the other fingers 27 as shown at 34 and then extended beyond the ends of the fingers 27 as shown by the spaced convolutions 35. The relatively closely spaced convolutions 30 and 34 firmly hold the wire or cable 33 in the saddle 18, and in the event wire 33 moves longitudinally by reason of expansion or contraction or by reason of the wire swinging under the action of wind or for other reasons, the cradle 18 may be permitted to have movement relative to the bracket 13 and the support 10 to the limit permitted in the slots 21.

In Figures 6 and 7, there is disclosed a slightly modified form of this invention wherein a U-shaped supporting member 10ª is provided which has a slot 21ª opening through one end of each of the parallel legs 19ª of the supporting member. The trunnions 20ª are adapted to rockably and slidably engage in the channels 21ª and are limited in their movement toward one end of the supporting member 10ª by means of a U-shaped channel closing plate 36 which is secured to the end of the member 10ª having the open slots 21ª by means of screws or bolts 37. It will be understood that if desired, the plate 36 may be secured to the supporting member 10ª by any other suitable fastening device, such as welding or other fastening means. The saddle 18ª is similar in every detail to the saddle 18 in Figure 5 being provided with a longitudinally extending channel 30ª on the bight thereof within which the tie wire is adapted to engage.

In Figure 8 there is disclosed a further modification of this invention wherein a U-shaped supporting member 10ᵇ is provided similar to the supporting member 10 and having a saddle 18ᵇ which is rockably and slidably mounted in the parallel legs 19ᵇ in the same manner as the saddle 18 is mounted between the parallel legs 19. The supporting member 10ᵇ is provided for the purpose of attachment to a dielectric insulator 38 having a seat portion 39. The supporting member 10ᵇ is provided with a split band 40 which is adapted to engage about the seat portion 39 of the insulator 38 and this band 40 is provided with a pair of ears 41 which are drawn toward each other by means of a bolt or clamping member 42. In this manner the band 40 may be contracted about the head or seat portion 39 of the insulator 38.

In Figure 9 there is disclosed a further modification of this invention wherein a U-shaped cradle supporting member 10ᶜ is provided which is similar in every detail to the supporting member 10, and a cradle 18ᶜ is rockably and swingably disposed between the parallel legs 19ᶜ of the cradle 10ᶜ in the same manner as the cradle 18. The supporting member 10ᶜ is provided with a threaded stud 43 which is adapted to engage in a threaded socket 44 provided in the upper portion of an insulator 45. The insulator 45 is formed of non-conducting material whereas the supporting member 10ᶜ may be provided of metal or the like.

In the use of this device where the bracket shown in Figures 1 to 7 inclusive is used for a neutral line, the entire bracket structure including the saddle and support therefor may be made out of metal. The U-shaped member 10 may be initially formed with the parallel legs thereof spread apart a distance sufficient to permit the insertion of the saddle 18 with the trunnions 20 therebetween. The parallel legs of the saddle may then be pressed toward each other a distance sufficient to prevent the removal of the saddle from the supporting member 10. The wire or cable 33 is placed in the seat formed by the saddle 18 and then the tie wire 30 is wrapped about the clamping arms 27 and extended beyond the ends of the arms as shown at 32 and 35 so as to provide a vibration dampening means for the wire 33. During the swinging movement of the wire 33, the saddle or support 18 may swing in a horizontal direction by reason of the loose mounting of the saddle 18 between the legs 19 and at the same time the saddle 18 may rock vertically through a limited degree. In this manner the supporting member for the wire 33 will not in itself tend to cause a breakage of the wire 33 at the ends of the supporting member as is at present the case.

Where it is desired to mount a movable or flexible support for a live wire which is secured to the tops of insulators similar to that shown in Figure 8, the present construction of the insulators may be used and it is only necessary to mount the U-member 10ᵇ on the top portion 39 of the insulator and then clamp the ring 40 about the insulator top. The wire may then be secured in the saddle 18ᵇ as shown in Figures 1 and 2.

Where new insulators are installed on posts or supports, a special construction of insulator may be provided similar to that shown in Figure 9 where the insulator 45 has a flexible support threaded into the top thereof. The wire may be secured in the saddle or cradle 18ᶜ in the same manner as shown in Figures 1 and 2.

The seat formed by the bight of the cradle 18 is preferably arched or longitudinally curved so that when the wire 33 is seated in the cradle 18, the sagging of the wire on opposite sides of the cradle due to the weight thereof will not tend to cut the wire as is the case where the cradle is straight and the ends of the cradle bear the strain.

By arching the bottom of the cradle the strain of the wire 33 is applied to substantially the full length of the cradle.

What I claim is:

1. A wire supporting bracket comprising a U-shaped member provided with confronting horizontally elongated recesses in the parallel legs thereof, means for securing said member on a support, a cradle disposed between the legs of said member and adapted to receive therein a wire, trunnions carried by said cradle above its wire supporting seat and loosely engaging in said recesses whereby said cradle is slidably and pendulously supported between the legs of said member, and means binding the wire in said cradle.

2. A wire supporting bracket comprising a U-shaped supporting member provided, in the parallel legs thereof, with confronting longitudinally elongated recesses, a cradle U-shaped in transverse section, disposed between the legs of said member, having outwardly extending trunnions adjacent the upper ends of its legs and which are disposed within said longitudinally elongated recesses, and means for securing said bracket to a primary support member; the construction and arrangement being such that said cradle is pendulously supported within and free to move longitudinally of the U-shaped support member.

3. A wire supporting bracket comprising a U-shaped supporting member, an L-shaped bracket secured to said member, a cradle U-shaped in transverse section disposed between the legs of said member, coacting means carried by said member and said cradle slidably and rockably mounting said cradle on said member, and a pair of spaced apart fingers carried by each end of said cradle, said fingers being disposed in outwardly divergent relation and terminating at their outer ends in enlarged portions.

4. A wire supporting bracket comprising a U-shaped supporting member, an L-shaped bracket secured to said member, a cradle U-shaped in transverse section disposed between the legs of said member, coacting means carried by said member and said cradle slidably and rockably mounting said cradle on said member, a pair of spaced apart fingers carried by each end of said cradle, and a wire tie member spirally engaging about said fingers.

5. A wire supporting bracket comprising a U-shaped supporting member, an L-shaped bracket secured to said member, a cradle U-shaped in transverse section disposed between the legs of said member, coacting means carried by said member and said cradle slidably and rockably mounting said cradle on said member, a pair of spaced apart fingers carried by each end of said cradle, said member having a longitudinally disposed groove in the under side thereof, and a wire tie member seated in said groove and spirally wrapped about said fingers.

6. A wire supporting bracket comprising a U-shaped supporting member, an L-shaped bracket secured to said member, a cradle U-shaped in transverse section disposed between the legs of said member, coacting means carried by said member and said cradle slidably and rockably mounting said cradle on said member, a pair of spaced apart fingers carried by each end of said cradle, said member having a longitudinally disposed groove in the underside thereof, and a wire tie member seated in said groove and spirally wrapped about said fingers, the ends of said wire tie being spirally wrapped about the wire in deeply pitched convolutions disposed beyond the ends of said fingers whereby to provide a vibration dampening means.

7. A wire supporting means comprising a U-shaped supporting member, the confronting faces of the legs of said member having elongated recesses therein opening through an end of said member, a U-shaped plate, means securing said plate on said end of said member, a U-shaped cradle disposed between the legs of said member, trunnions carried by said cradle slidably and rockably engaging in said recesses, and a pair of longitudinally extending fingers carried by each end of said cradle.

8. A wire supporting bracket comprising a U-shaped member provided with confronting horizontally elongated recesses in the parallel legs thereof, a cradle disposed between the legs of said member and adapted to receive therein a wire, trunnions carried by said cradle adjacent the upper ends of its legs and loosely engaging in said recesses whereby said cradle is slidably and pendulously supported between the legs of said member, means for binding the supported wire in said cradle, and means for securing said member to a support.

9. A wire-supporting bracket comprising a U-shaped cradle supporting member, a cradle member disposed between the legs of said supporting member, said cradle member being U-shaped in transverse section and the inner surface of the bight of said cradle member being longitudinally arched, one of said members having an elongated slot in the side of each leg thereof confronting the legs of the other member, the other member having trunnions loosely engaging in said slots, and divergent outwardly extending fingers carried by the ends of said cradle member, said cradle member having a groove on the under side thereof to receive a wire tie member.

WILLIAM LANCASTER.